(12) United States Patent
Nakamura (10) Patent No.: US 9,529,142 B2
(45) Date of Patent: Dec. 27, 2016

(54) LIQUID CRYSTAL DISPLAY DEVICE (71) Applicant: Japan Display Inc., Tokyo (JP)

(72) Inventor: Norihiro Nakamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/722,229

(22) Filed: May 27, 2015

(65) Prior Publication Data

US 2015/0346423 A1  Dec. 3, 2015

(30) Foreign Application Priority Data

Jun. 2, 2014 (JP) .................................. 2014-114228

(51) Int. Cl.
*G02F 1/1335* (2006.01)
*F21V 8/00* (2006.01)

(52) U.S. Cl.
CPC ............ *G02B 6/0073* (2013.01); *G02B 6/0068* (2013.01)

(58) Field of Classification Search
CPC .................................................. G02B 6/0073
USPC ............................................................ 349/65
See application file for complete search history.

(56) References Cited

U.S. PATENT DOCUMENTS 8,064,006 B2 * 11/2011 Park .................. G02F 1/133608
349/58
2010/0045898 A1 * 2/2010 Lee ...................... G02B 6/0046
349/65

FOREIGN PATENT DOCUMENTS

JP         2014029798 A      2/2014

* cited by examiner

*Primary Examiner* — Lucy Chien
(74) *Attorney, Agent, or Firm* — Typha IP LLC (57) ABSTRACT A liquid crystal display device includes a plurality of light source packages each having a light-emitting portion for emitting light, a light guide plate which light emitted from the light source packages enters through the incidence surface, having a height and a width, and from which the light exits through the exit surface, and a liquid crystal display panel for controlling, for each pixel, the orientation of a liquid crystal material to control the transmission of the light exiting through the exit surface. Each light source package has two opposing long sides and two opposing short sides when viewed from the direction of the light emitted by the light-emitting portion. The plurality of light source packages are arranged long side to long side in the direction along the width.

10 Claims, 8 Drawing Sheets

LIQUID CRYSTAL DISPLAY DEVICE

CROSS-REFERENCE TO RELATED APPLICATION

The present application claims priority from Japanese application JP2014-114228 filed on Jun. 2, 2014, the content of which is hereby incorporated by reference into this application.

BACKGROUND OF THE INVENTION

1. Field of the Invention

The present invention relates to a liquid crystal display device.

2. Description of the Related Art

Liquid crystal display devices are widely used as display devices in televisions or information communication terminals such as computers. Such a liquid crystal display device is configured to change the orientation of a liquid crystal material sandwiched between two substrates by changes in an electric field, thus controlling the transmission of light passing through these two substrates and the liquid crystal material to produce images.

In such a liquid crystal display device, it is common to use a lighting device called a "backlight" as a light source. As backlighting systems, a direct-lit backlight, which has light sources behind a liquid crystal display surface, and an edge-lit (side-lit) backlight, which illuminates a liquid crystal display surface by reflecting light emitted from the side, are typically known. The liquid crystal display devices used in recent mobile communication terminals, such as smartphones, are required to be made smaller and consume less power. Thus, the edge-lit backlights including light emitting diodes (LEDs) as light sources have come into use.

JP 2014-029798 A discloses a lighting device with an edge-lit backlight that can enhance the efficiency of providing light to a light guide plate to reduce the thickness of the lighting device.

In the above edge-lit backlight, light sources such as LEDs are arranged along any one or more of the four sides of the screen. If more light sources were arranged to increase the brightness, the frame area formed around the display area would be wider to make the display device larger.

SUMMARY OF THE INVENTION

In view of the above circumstances, it is an object of the present invention to provide a liquid crystal display device that can increase the brightness without widening the frame area.

Exemplary liquid crystal display devices to solve the above problems are as follows.

(1) A liquid crystal display device includes a plurality of light source packages each having a light-emitting portion for emitting light, a light guide plate which light emitted from the light source packages enters through the incidence surface, having a height and a width, and from which the light exits through the exit surface, and a liquid crystal display panel for controlling, for each pixel, the orientation of a liquid crystal material to control the transmission of the light exiting through the exit surface. Each light source package has two opposing long sides and two opposing short sides when viewed from the direction of the light emitted by the light-emitting portion. The plurality of light source packages are arranged long side to long side in the direction along the width.

(2) In the liquid crystal display device according to the above (1), the center of the light-emitting portion may be located at a position that does not overlap with a centerline connecting the midpoints of the long sides of the light source package when viewed from the direction of the emitted light, and the plurality of light source packages may be arranged so that a light source centerline connecting the centers of the light-emitting portions overlaps with a light guide plate centerline indicating half the height of the incidence plane when viewed from the direction of the emitted light.

(3) In the liquid crystal display device according to the above (1), the direction in which the long sides of each of the plurality of light source packages extend may be oblique to the direction along the height of the incidence plane.

(4) In the liquid crystal display device according to the above (1) or (3), the plurality of light source packages may be arranged in the direction along the width so that the light source packages having the light-emitting portion in one side thereof in the direction along the height alternate with the light source packages having the light-emitting portion in the other side.

(5) In the liquid crystal display device according to the above (1), the plurality of light source packages may each have a plurality of the light-emitting portions arranged therein, and the center of gravity of a shape having the centers of the plurality of light-emitting portions as vertexes may be arranged at the same level as half the height of the incidence plane of the light guide plate when viewed from the direction of the emitted light.

DETAILED DESCRIPTION OF THE INVENTION

Embodiments of the present invention are described below with reference to the accompanying drawings. The disclosure herein is merely an example, and appropriate modifications coming within the spirit of the present invention, which are easily conceived by those skilled in the art, are intended to be included within the scope of the invention as a matter of course. The accompanying drawings schematically illustrate widths, thicknesses, shapes, or other characteristics of each part for clarity of illustration, compared to actual configurations. However, such a schematic illustration is merely an example and not intended to limit the present invention. In the present specification and drawings, some elements identical or similar to those shown previously are denoted by the same reference signs as the previously shown elements, and thus repetitive detailed descriptions of them may be omitted as appropriate.

Figure 1:
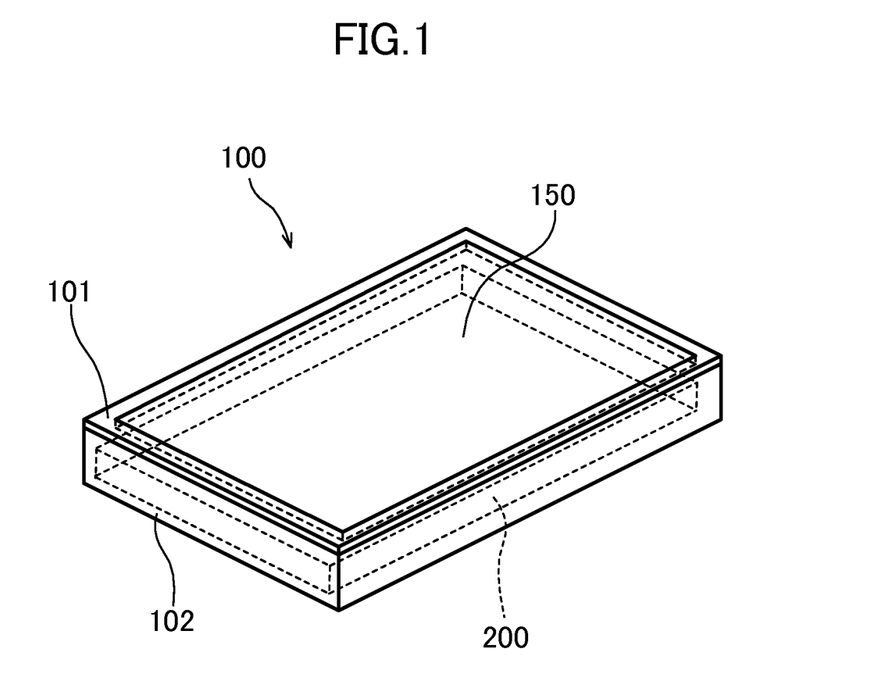
FIG. 1 is a diagram schematically showing a liquid crystal display device according to an embodiment of the present invention.

FIG. 1 schematically shows a liquid crystal display device 100 according to an embodiment of the present invention. As shown in the diagram, the liquid crystal display device 100 includes a liquid crystal display panel 150, a mold frame 101 fixing the liquid crystal display panel 150, a backlight unit 200 that illuminates the liquid crystal display panel 150 from behind, and a lower frame 102 housing the backlight unit 200. The liquid crystal display panel 150 controls the orientation of a liquid crystal material sandwiched between two substrates to control the transmission of light. Such a configuration is shown in this embodiment, whereas only a frame or other housings without the mold frame 101 may house both the liquid crystal display panel 150 and the backlight unit 200. The liquid crystal display panel 150 may be a well-known or suitable liquid crystal display panel that controls the orientation of a liquid crystal material by what is called an in-plane switching (IPS) or other systems.

Figure 2:
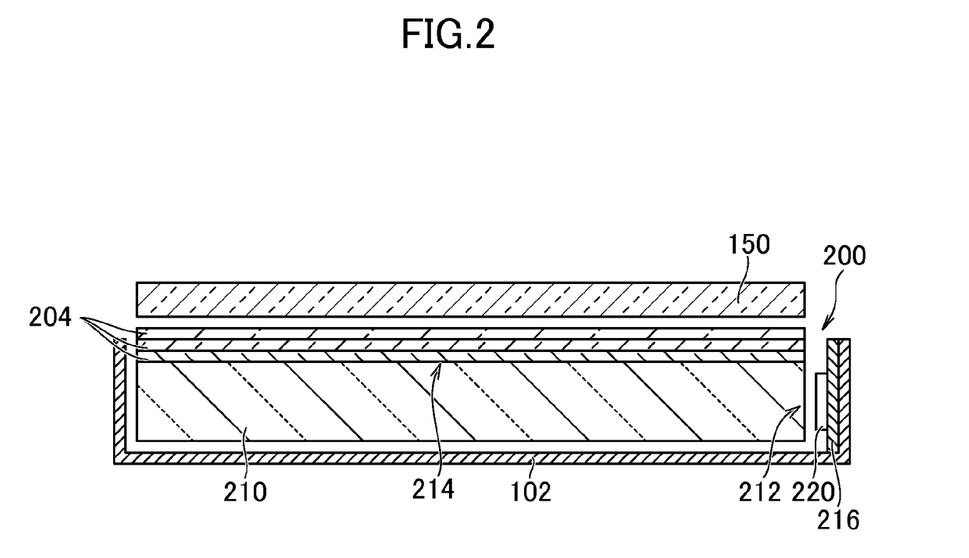
FIG. 2 is a diagram schematically showing a cross section of a lower frame, a backlight unit, and a liquid crystal display panel.

FIG. 2 is a diagram schematically showing a cross section of the lower frame 102, the backlight unit 200, and the liquid crystal display panel 150. As shown in the diagram, the backlight unit 200 includes a plurality of light source packages 220, a package-arranging plate 216, a light guide plate 210, and an optical sheet 204. The light source packages 220 have as light sources, for example, LEDs that emit white light. The plurality of light source packages 220 are arranged on the package-arranging plate 216. The light emitted from the light source packages 220 enters the light guide plate 210 through an incidence surface 212 and exits through an exit surface 214 as planar light. The optical sheet 204 is formed of prism sheets stacked on the exit surface 214 and a diffuser sheet. The backlight unit 200 is disposed in the lower frame 102. The liquid crystal display panel 150 is disposed on the optical sheet 204 of the backlight unit 200. Here, the composition of the optical sheet 204 may be modified as appropriate. Alternatively, other configuration without the optical sheet 204 may be employed. The backlight unit 200 may have a reflective sheet, which reflects light tending to exit the light guide plate 210 through the bottom, under the light guide plate 210. In this embodiment, the light source packages 220 are arranged so that the direction of the light emitted from the light source packages 220 is perpendicular to the incidence surface 212 of the light guide plate 210. Alternatively, the direction of the light emitted from the light source packages 220 may be oblique to the incidence surface 212 of the light guide plate 210.

Figure 3:
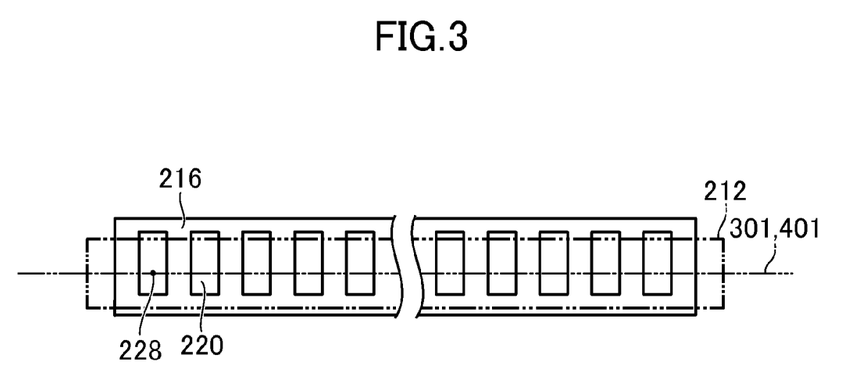
FIG. 3 is a diagram showing a layout of a plurality of light source packages arranged on a package-arranging plate.

FIG. 3 is a diagram showing a layout of the plurality of light source packages 220 arranged on the package-arranging plate 216 when viewed from the direction of the light emitted from the light source packages 220. In this diagram, the outline of the incidence surface 212 of the light guide plate 210 is indicated by two-dot chain lines to show the positional relationship between the light source packages 220 and the light guide plate 210. The light source packages 220 are each what is called a chip LED, which includes, for example, an LED device, a substrate including a circuit coupled to the LED device by wire bonding, a resin containing a phosphor and covering the LED device, and anode and cathode electrodes for coupling to an external circuit.

The light source package 220 can be selected from among well-known or suitable chip LEDs.

Figure 4:
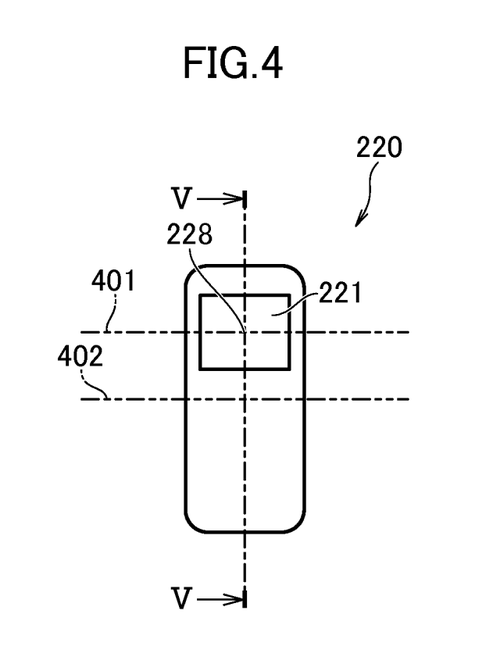
FIG. 4 is a diagram showing an arrangement of a light-emitting portion in the light source package.

As shown in FIG. 3, the light source packages 220 each have a rectangular face with two long sides and two short sides, and are attached to the package-arranging plate 216 so as to be arranged long side to long side. As shown in FIG. 4, the center 288 of a light-emitting portion 221 of the light source package 220 is located at a position that does not overlap with a centerline 402 connecting the midpoints of the long sides of the light source package 220. That is, the centerline 402 of the light source package 220 is arranged in a position different from a light source centerline 401 connecting the centers of the light-emitting portions 221. The light-emitting portion 221 is a portion that actually emits light, where the LED device is disposed in this case. The center of the light-emitting portion 221 may be the center of gravity of the light-emitting portion 221 when viewed from the direction of the light emitted from the light source package 220. In this embodiment, as shown in FIG. 3, the light source centerline 401 is arranged to overlap with a light guide plate centerline 301, which is the centerline indicating half the height of the light guide plate 210. The height of the light guide plate 210 here is the length extending in the direction perpendicular to the exit surface 214 of the light guide plate 210, and the width is the length extending in the direction perpendicular to the height on the incidence surface 212.

Thus, the plurality of light source packages 220 are arranged long side to long side with each other in the width direction. Therefore, a larger number of light source packages 220 can be arranged along one side to increase the brightness of the backlight unit 200 without widening the frame area. Even when the plurality of light source packages 220 are arranged long side to long side, the center of the emitted light is incident on the incidence surface 212 of the light guide plate 210 at half the height of the surface. This arrangement can enhance the use efficiency of the light. In addition, this arrangement can reduce the number of package-arranging plates 216, which are arranged along sides of the display area.

Figure 5:
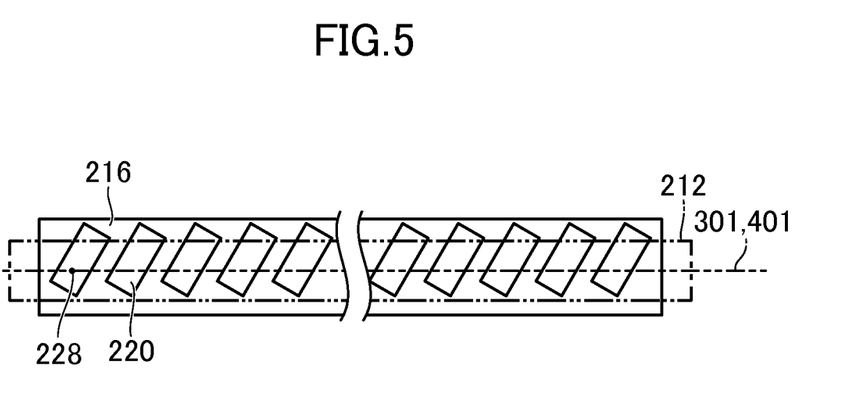
FIG. 5 is a diagram illustrating a layout of the plurality of light source packages, which are arranged on the package-arranging plate to incline at an angle of 30° to the height direction of a light guide plate.
Figure 6:
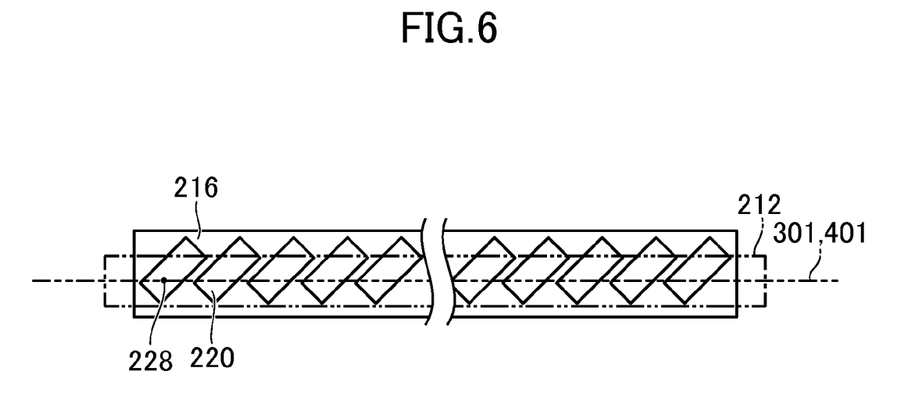
FIG. 6 is a diagram illustrating a layout of the plurality of light source packages, which are arranged on the package-arranging plate to incline at an angle of 45° to the height direction of the light guide plate.

In FIG. 3, the light source packages 220 are arranged so that the long sides of the light source packages 220 are directed in the height direction of the light guide plate 210. Alternatively, the long sides of the light source packages 220 may be directed obliquely as shown in FIGS. 5 and 6, for example, when the package-arranging plate 216 or the light guide plate 210 is limited in height. Also in this case, the light source centerline 401 can be arranged to overlap with the light guide plate centerline 301 of the light guide plate 210. FIG. 5 is a diagram showing an example where the light source packages 220 are inclined at an angle of 30° to the height direction of the light guide plate 210. FIG. 6 is a diagram showing an example where the light source packages 220 are inclined at an angle of 45° to the height direction of the light guide plate 210. Thus, the direction in which the long sides of the light source packages 220 extend is oblique to the height direction of the incidence surface 212. This can enhance the use efficiency of light as well as arrange the light source packages 220 for the light guide plate 210 having a smaller thickness (height) or for the package-arranging plate 216 having a lower height. The configurations shown in FIGS. 5 and 6 can also produce the same effects as those described in the above embodiment.

Figure 7:
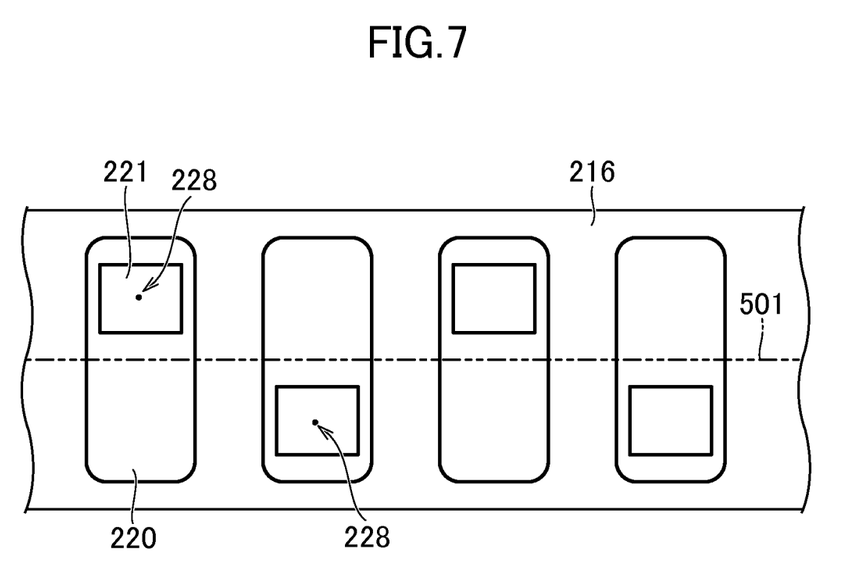
FIG. 7 is a diagram illustrating a modified arrangement of the light source packages arranged on the package-arranging plate.

FIG. 7 is a diagram illustrating a modified arrangement of the light source packages 220 arranged on the package-arranging plate 216. As illustrated in the diagram, in each light source package 220, the center 288 of the light-emitting portion 221 is located at a position that does not overlap with the centerline 402 connecting the midpoints of the long sides of the light source package 220, as in the above embodiment. Here, the plurality of light source packages 220, each having the light-emitting portion 221 in one of two sides (halves) thereof in the long side direction, are arranged long side to long side so that those having the light-emitting portion 221 in one side (upper half) alternate with those having the light-emitting portion 221 in the other side (lower half). Such an arrangement can cause a light source centerline 501, which is the longitudinal centerline of the combination of the plurality of light source packages 220, to overlap with half the height of the light guide plate 210 to enhance the use efficiency of light, for example, even when the light source centerline 401 cannot be arranged to overlap with the light guide plate centerline 301 in the arrangement as shown in FIG. 3 because of structural reasons. Such a modification can also produce the same effects as those described in the above embodiment.

Figure 8:
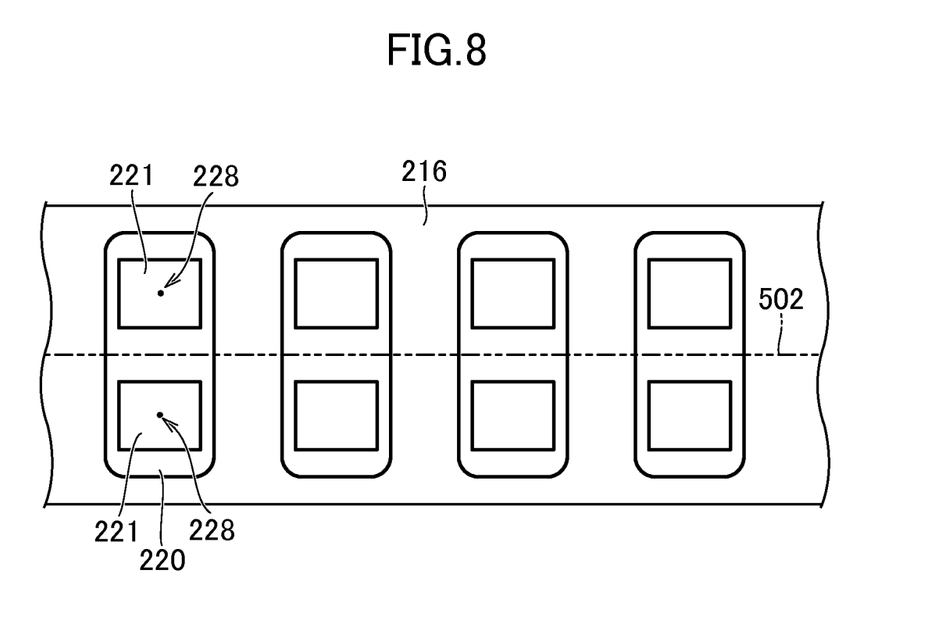
FIG. 8 is a diagram illustrating another modified arrangement of the light source packages arranged on the package-arranging plate.

FIG. 8 is a diagram illustrating another modified arrangement of the light source packages 220 arranged on the package-arranging plate 216. As illustrated in the diagram, the light source packages 220 according to this modification each have two light-emitting portions 221. In this case, the midpoints of the line segment joining the centers 288 of the two light-emitting portions 221 of individual light source packages 220 can be determined as centers that become a reference of a light source centerline, and the line connecting these centers can be defined as a light source centerline 502. Even for such light source packages 220, the use efficiency of light can be enhanced by arranging the light guide plate 210 so that the light source centerline 502 overlaps with the light guide plate centerline 301 when viewed from the direction of the light emitted from the light-emitting portions 221. Whereas the light source packages 220 each have two light-emitting portions 221 in this modification, they may each have three or more. In such a case, the center of gravity of the shape that has the centers of the plurality of light-emitting portions 221 as its vertexes can be defined as centers that become a reference of a light source centerline. Such a modification can also produce the same effects as those described in the above embodiment.

In the above embodiment, half the height of the light guide plate 210, which is defined as the light guide plate centerline 301, is determined to be at the same level as the center of incident light. Alternatively, the position where the use efficiency of the incident light is maximized may be determined as the light guide plate centerline 301, when the use efficiency of the incident light is not maximized at half the height of the light guide plate 210 as a result of using a reflective sheet or the like spread on the lower frame 102 side of the light guide plate 210.

In the above embodiment, LEDs are used as the light sources. Alternatively, other self-luminous light-emitting devices may be used. Whereas the backlight unit 200 in the above embodiment is used for the liquid crystal display device, it may be used for display devices employing micro electro mechanical systems (MEMS) or other display devices.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
   a plurality of light source packages each having a light-emitting portion for emitting light;
   a light guide plate including an incidence surface which faces the light-emitting portion, the incidence surface having a height and a width, the light guide plate including an exit surface, light emitted from the light-emitting portion being incident on the incidence surface and exiting through the exit surface; and
   a liquid crystal display panel for controlling, for each pixel, an orientation of a liquid crystal material to control a transmission of the light exiting through the exit surface, wherein
   the incidence surface and the exit surface are nonparallel to each other,
   each light source package has the light-emitting portion on a surface thereof, the surface having two opposing long sides and two opposing short sides when viewed from a direction of the light emitted by the light-emitting portion, and
   the plurality of light source packages are arranged long side to long side in a direction along the width.

2. The liquid crystal display device according to claim 1, wherein
   a center of the light-emitting portion is located at a position not overlapping with a centerline connecting midpoints of the long sides of the light source package when viewed from the direction of the emitted light, and
   the plurality of light source packages are arranged so that a light source centerline connecting centers of the light-emitting portions overlaps with a light guide plate centerline indicating half the height of the incidence plane when viewed from the direction of the emitted light.

3. The liquid crystal display device according to claim 1, wherein
   a direction in which the long sides of each of the plurality of light source packages extend is oblique to a direction along the height of the incidence plane.

4. The liquid crystal display device according to claim 1, wherein
   the plurality of light source packages are arranged in the direction along the width so that the light source packages having the light-emitting portion in a first side thereof in a direction along the height alternate with the light source packages having the light-emitting portion in a second side.

5. The liquid crystal display device according to claim 1, wherein
   the plurality of light source packages each have a plurality of the light-emitting portions arranged therein, and
   a center of gravity of a shape having centers of the plurality of light-emitting portions as vertexes is arranged at the same level as half the height of the incidence plane of the light guide plate when viewed from the direction of the emitted light.

6. A liquid crystal display device, comprising:
   a liquid crystal display panel;
   a light guide plate behind the liquid crystal display panel, the light guide plate including an incidence plane and an exit plane; and a light source facing the incidence plane of the light guide plate, the light source having a light-emitting portion which emits light to be incident on the incidence plane, wherein the light guide plate is configured for the light to be reflected inside the light guide plate and exit through the exit plane, the light source has a rectangular face, the rectangular face has a pair of opposing long sides being parallel to the incidence plane, the light-emitting portion is formed in the rectangular face, a center of the light-emitting portion is located off a center of the rectangular face, the incidence plane has a rectangular shape having a height and a width, and the long sides extend in a direction along the height of the incidence plane.

7. The liquid crystal display device according to claim 6, wherein
the center of the light-emitting portion is arranged to overlap with half the height of the incidence plane.

8. The liquid crystal display device according to claim 6, wherein
a direction in which the long sides extend is oblique to a direction along the height of the incidence plane.

9. The liquid crystal display device according to claim 6, wherein
a plurality of the light sources are arranged to face the incidence plane of the light guide plate, the rectangular face is divided into two halves, and
adjacent two of the plurality of light sources are arranged so that the light-emitting portions of the two light sources are located in the opposite halves.

10. The liquid crystal display device according to claim 6, wherein the light source has a plurality of the light-emitting portions.

* * * * *